(12) United States Patent
Moon et al.

(10) Patent No.: US 6,746,887 B1
(45) Date of Patent: Jun. 8, 2004

(54) METHOD OF PREVENTING A DATA PAD OF AN ARRAY SUBSTRATE FROM OVERETCHING

(75) Inventors: Kyo-Ho Moon, Taegu (KR); Soon-Sung Yoo, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/784,088

(22) Filed: Feb. 16, 2001

(30) Foreign Application Priority Data

Feb. 19, 2000 (KR) .......................................... 2000-8041

(51) Int. Cl.⁷ .............................................. H01L 21/00

(52) U.S. Cl. ....................................................... 438/30

(58) Field of Search ........................... 438/30, 149, 158, 438/153

(56) References Cited

U.S. PATENT DOCUMENTS 6,204,081 B1 * 3/2001 Kim et al. .................... 438/30

* cited by examiner

*Primary Examiner*—David Nelms
*Assistant Examiner*—Quoc Hoang
(74) *Attorney, Agent, or Firm*—McKenna Long & Aldridge LLP

(57) ABSTRACT

A method of fabricating an array substrate for use in an LCD device which can be used in a four-, five- or six-mask process includes simultaneously etching layers formed over gate and data pads. When performing a photolithography process, photoresist remains over the data pad and acts as an etch stopper. And thus, while etching the layers over the gate pad, the layers over the data pad are etched without any damage to the data pad and without overetching the data pad. Therefore, defects caused by the resistance between the data pad and the data pad electrode do not occur, and pixel defects in the LCD device are prevented. Moreover, the manufacturing yield increases when this method is used.

16 Claims, 6 Drawing Sheets

METHOD OF PREVENTING A DATA PAD OF AN ARRAY SUBSTRATE FROM OVERETCHING

This application claims the benefit of Korean Patent Application No. 2000-8041, filed on Feb. 19, 2000, which is hereby incorporated by reference as if fully set forth herein.

BACKGROUND OF THE INVENTION

1. Field of the Invention

The present invention relates to a thin film transistor-liquid crystal display (TFT-LCD) device. More particularly it relates to a method of preventing overetching a data pad when fabricating an array substrate for use in the TFT-LCD device.

2. Discussion of the Related Art

In general, an LCD device is divided into a display part and a pad part. The display part of an LCD device is typically made up of a liquid crystal interposed between two substrates. One substrate, referred to as an array substrate, includes a matrix array of thin film transistors (TFTs) as switching devices and pixel electrodes. The array substrate also includes gate and data lines having gate and source electrodes, respectively. The gate and data lines cross each other. The opposing substrate, referred to as a color filter substrate, includes a light-shielding film (also known as a black matrix), a color filter, and a common electrode.

The pad part of an LCD device includes gate pads and source pads applying signal voltage and data voltage to the gate lines and the data lines, respectively. The gate pads are arranged on one side of the array substrate and the source pads are arranged on an adjacent side of the gate pads.

To make the array substrate described above, a depositing technique, a photolithography technique, and an etching technique are repeated several times. The specific method of etching is determined by the substance that is etched. Of these, the etching technique includes dry-etching and wet-etching. Dry-etching isotrophically etches an object, while wet-etching anisotropically etches it. Dry-etching generally uses gases, while wet-etching uses acids and other chemical solutions as an etchant. In chemical dry-etching, for example plasma dry-etching, plasma is used to generate gas radicals in order to etch any portions of a thin film. In physical dry-etching, for example ion beam milling etching, an ion beam is used in order to etch any portions of a thin film.

Referring to the attached drawings, an array substrate of an LCD device that is manufactured by a conventional method will now be explained in some detail.

FIG. 1 is a partial plan view illustrating an array substrate manufactured according to a conventional method of fabricating a TFT array substrate using a four-mask process. As shown in FIG. 1, the array substrate 8 of the LCD device includes, for example, TFTs "A", pixels "P", gate pads 11, gate lines 13, data pads 15 and data lines 19. Each TFT has a source electrode 17, a drain electrode 18, a gate electrode 10 and an active layer 16 as a channel region. The gate electrode 10 extends from the gate line 13 and the source electrode 17 extends from the data line 19. The drain electrode 18 is spaced apart from the source electrode 17. The gate and data pads and 15 act to apply the signals. Although not recognized in FIG. 1, the data pads 15 are formed in later process steps than the gate pads 11 so that the data pads 15 positioned above the gate pads 11.

The steps of forming the elements shown in FIG. 1 will be explained with reference to FIGS. 2A to 2D, hereinafter.

FIGS. 2A to 2D are cross-sectional views taken along lines I—I, II—II and III—III of FIG. 1 and illustrate manufacturing process steps of the array substrate according to the conventional art As shown in FIG. 2A, a first metallic material such as Aluminum (Al), Al-alloy, Chrome (Cr) or Tungsten (W) is deposited on the substrate 9. And then the first metal layer is patterned in a designed shape by a photolithography process using a first mask. During the photolithography process, a photoresist (not shown) is first formed on the first metal layer and then an exposure process is performed using the first mask. After that, portions of the photoresist, which are irradiated, are removed, and the exposed portions of the first metal layer are then etched. Next, the remaining photoresist is removed. Finally, the gate line (see element 13 of FIG. 1), the gate electrode 10 extended from the gate line, and the gate pad 11 arranged at the end of the gate line 13 (see FIG. 1) are formed. Then, a first insulation layer 26, a semiconductor layer 27 including intrinsic and extrinsic semiconductor, and a second metal layer 24 are sequentially formed on the substrate 9 and over the patterned first metal layer.

Referring to FIG. 2B, a second mask process is performed. The second metal layer 24 (see FIG. 2A) is patterned by the photolithography process described above. Thus, the data line 19, the source electrode 17, the drain electrode 18 and the data pad 15 are formed. The data line 19 is formed on the semiconductor layer 27, and the source electrode 17 is extended from the data line 19 and overlaps one end portion of the gate electrode 10. The drain electrode 18 is spaced apart from the source electrode 17 and overlaps the other end portion of the gate electrode 10. The data pad 15 is arranged at the end of the data line 19.

Still referring to FIG. 2B, a second insulation layer 31 is formed on the semiconductor layer 27 and over the patterned second metal layer. Accordingly, the first insulation layer 26, the semiconductor layer 27 and the second insulation layer 31 are formed over the gate pad 11. Moreover, the second insulation layer 31 is only formed over the drain electrode 18 and over the data pad 15.

FIG. 2C shows a step of forming contact holes 34, 35 and 36 using a third-mask process. As depicted, a photoresist 33 is deposited on the second insulation layer 31 and the exposure process is then performed using a third mask (not shown). Thus, the portions that are not irradiated are removed. After that, the exposed portions under the contact holes 34, 35 and 36 are etched. At this time, the layers (the first insulation layer 26, the semiconductor layer 27 and the second insulation layer 31) over the gate pad 11 and the second insulation layer 31 over the drain electrode 18 and gate pad 15 are simultaneously etched using dry-etching.

However, after eliminating the second insulation layer 31 over the data pad 15, the semiconductor layer 27 and first insulation layer 26 over the gate pad 11 are continuously being etched. Therefore, the data pad 15 is over-etched until all layers over the gate pad 11 are eliminated. If the data pad 15 is made of metal such as Molybdenum (Mo) or Titanium (Ti), which is easily etched by dry-etching, the portion of the data pad 15 is completely etched as shown in FIG. 2C, and thus the resistance increases due to the fact that the contact area between the data pad 15 and the electrode formed later is reduced.

Meanwhile, if the data pad 15 is made of Chrome (Cr), which is not etched very well by dry-etching, as shown in FIG. 2D the top surfaces oft he drain electrode 18 and of the data pad 15 are damaged by the plasma or the ion beam, and thus the resistance between the data pad 15 and the electrode formed later increases.

SUMMARY OF THE INVENTION

Accordingly, the present invention is directed to a method of fabricating an array substrate for use in a liquid crystal display device, which substantially obviates one or more of the problems due to limitations and disadvantages of the related art.

An object of the present invention is to provide a method of fabricating an array substrate that prevents the data pad from being over-etched and from being damaged.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the principles of the present invention provide a method of manufacturing an array substrate for use in an LCD device. Such a method of fabricating an array substrate for use in a liquid crystal display (LCD) device, beneficially including: forming a first metal layer on a substrate; forming a gate line, a gate electrode and a gate pad by patterning the first metal layer; forming sequentially a first insulation layer, a semiconductor layer and a second metal layer over the patterned first metal layer and on the substrate; forming a source electrode, a data line, a drain electrode and a data pad by patterning the second metal layer; forming a second insulation layer on the patterned second metal layer and on the semiconductor layer; forming a photoresist on the second insulation layer; performing an exposure process on the photoresist using a mask; removing completely a portion of the photoresist over the gate pad after performing the exposure process; removing incompletely a portion of the photoresist over the data pad after performing the exposure process, wherein some of the photoresist over the data pad remains; etching the second insulation and semiconductor layers over the gate pad while etching the residual photoresist over the data pad; and etching simultaneously the first insulation layer over the gate pad and the second insulation layer over the data pad.

The mask that is used in irradiating the photoresist beneficially includes a half-tone pattern or a diffraction slit. The residual photoresist over the data pad has a thickness of about from 500 Å to 5000 Å.

The principles of the present invention further provide a method of fabricating an array substrate for use in a liquid crystal display (LCD) device, beneficially including: forming first and second insulation layers over the gate pad; forming the second insulation layer on the data pad; depositing a photoresist on the second insulation layer, performing an exposure process on the photoresist using a mask; removing completely a portion of the photoresist over the gate pad after performing the exposure process; removing incompletely a portion of the photoresist over the data pad after performing the exposure process, wherein some of the photoresist over the data pad remains; and etching the first and second insulation layers over the gate pad while etching the residual photoresist and the second insulation layer over the data pad, wherein the residual photoresist acts as an etching stopper.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to illustrated embodiments of the principles of the present invention, examples of which are shown in the accompanying drawings. The numerals of the elements are different from the conventional art for a distinction.

Figure 1:
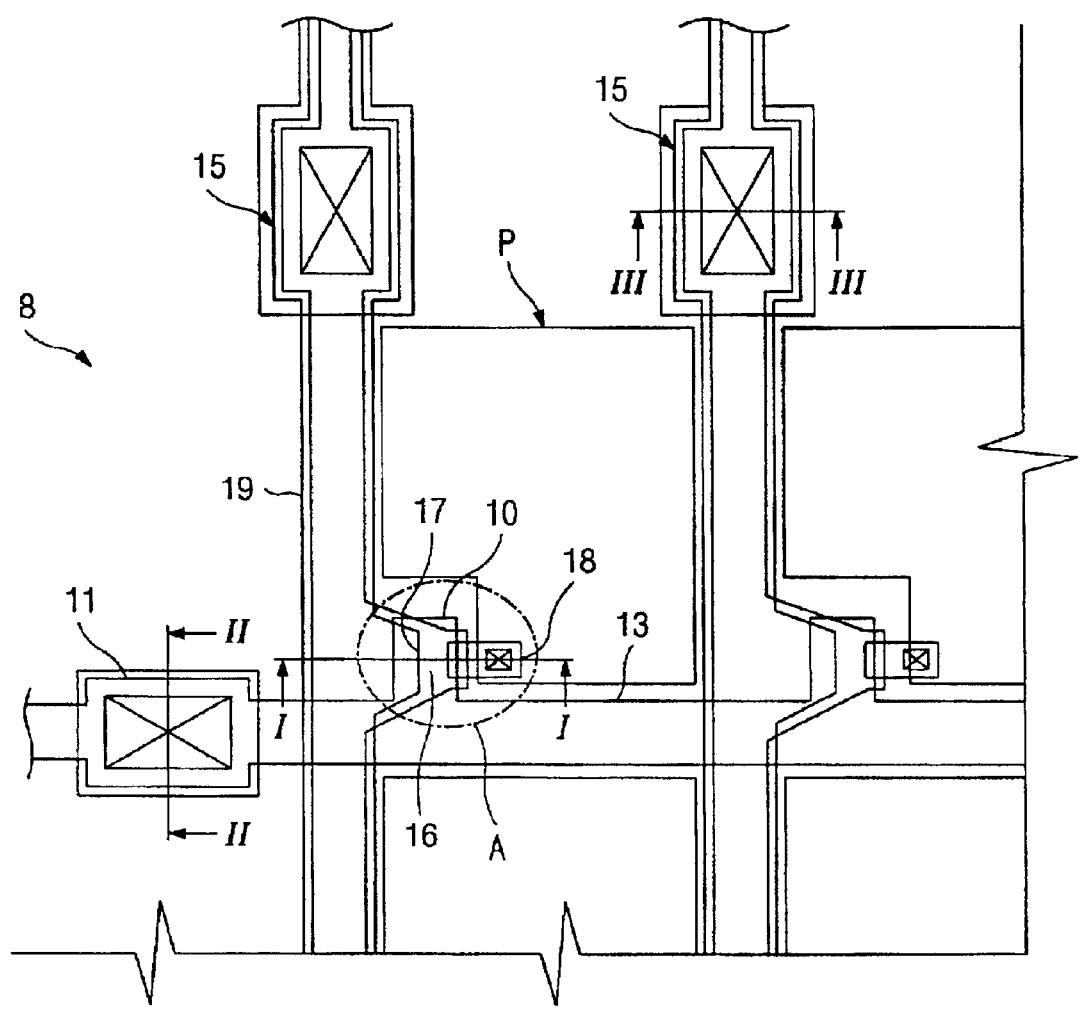
FIG. 1 is a partial plan view illustrating an array substrate according to a conventional fabrication method of a thin film transistor (TFT) array substrate using a four-mask process.
Figure 2A:
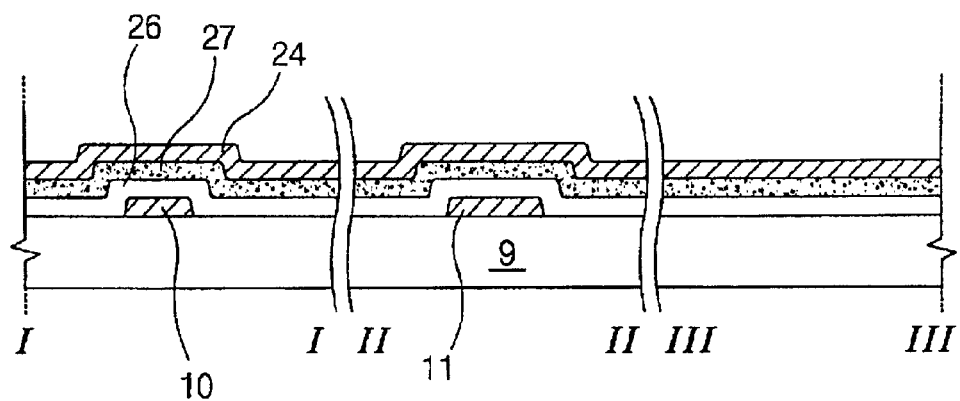
FIGS. 2A to 2D are cross-sectional views taken along lines I—I, II—II and III—III of FIG. 1 and illustrate manufacturing process steps of the array substrate according to the conventional art.
Figure 2B:
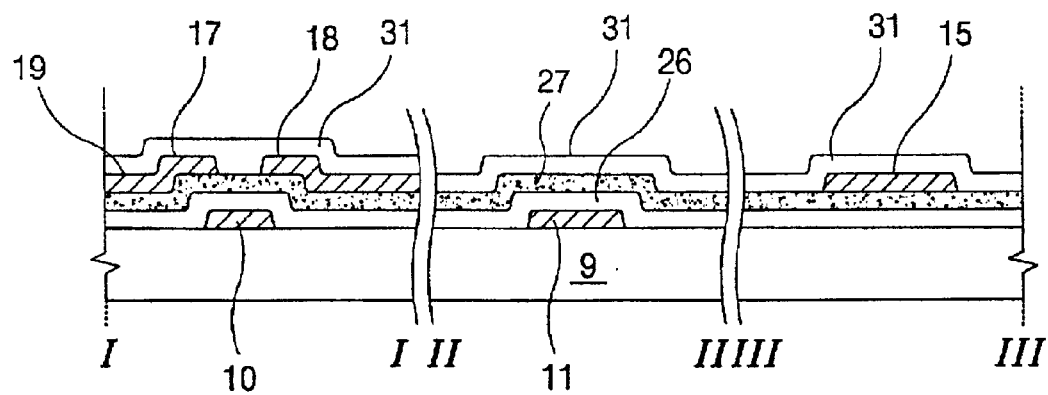
Figure 2C:
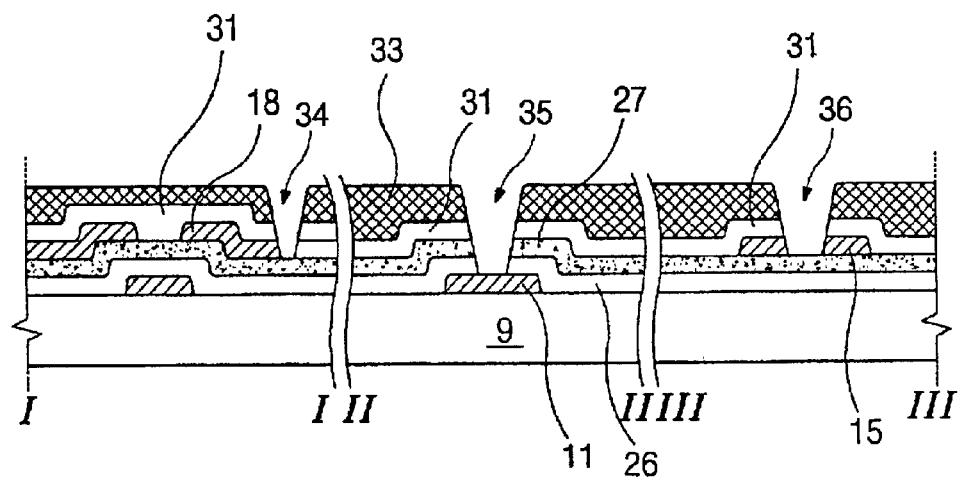
Figure 2D:
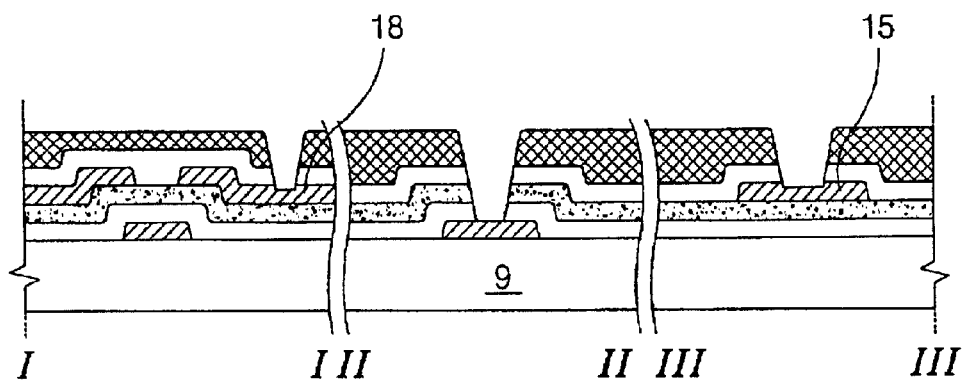
Figure 3A:
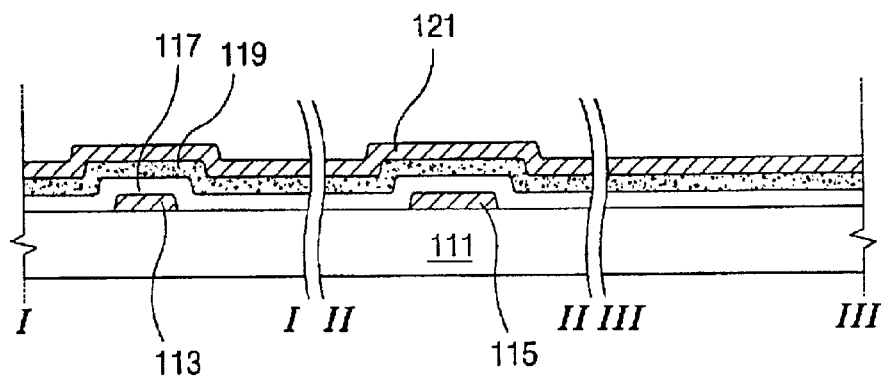
FIGS. 3A to 3F are cross-sectional views taken along lines I—I, II—II and III—III of FIG. 1 and illustrate manufacturing process steps of the array substrate according to a first embodiment of the present invention.
Figure 3B:
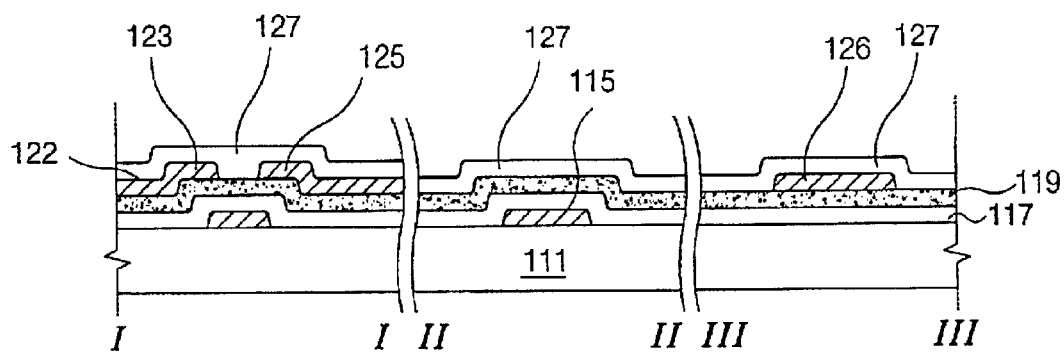

FIG. 3A to 3F are cross-sectional views taken along lines I—I, II—II and III—III of FIG. 1 and illustrate manufacturing process steps of the array substrate according to a first embodiment of the present invention. FIGS. 3A and 3B are the same of FIGS. 2A and 2B such that the reference will be made in brief.

FIG. 3A shows a first mask process. A first metallic material that is a conductive material is deposited on the substrate 111. And then the first metal layer is patterned to form a gate line (not shown), a gate electrode 113 and a gate pad 115. After that, a first insulation layer 117, a semiconductor layer 119 including intrinsic and extrinsic semiconductor, and a second metal layer 121 are sequentially formed on the substrate 111 and over the patterned first metal layer.

Referring to FIG. 3B, a second mask process is performed. The second metal layer 121 (see FIG. 3A) is patterned by the photolithography process. Thus, the data line 122, the source electrode 123, the drain electrode 125 and the data pad 126 are formed. A second insulation layer 127 is formed on the semiconductor layer 119 and over the patterned second metal layer. The second insulation layer 127 is made of an inorganic insulation material such as silicon nitride ($SiN_x$) or silicon oxide ($SiO_2$). The second insulation layer 127 can also be made of an organic insulation material such as acryl or BCB (benzocyclobutene). Accordingly, the first insulation layer 117, the semiconductor layer 119 and the second insulation layer 127 are formed over the gate pad 115. Moreover, the second insulation layer 127 only is formed over the drain electrode 125 and over the data pad 126.

Figure 3C:
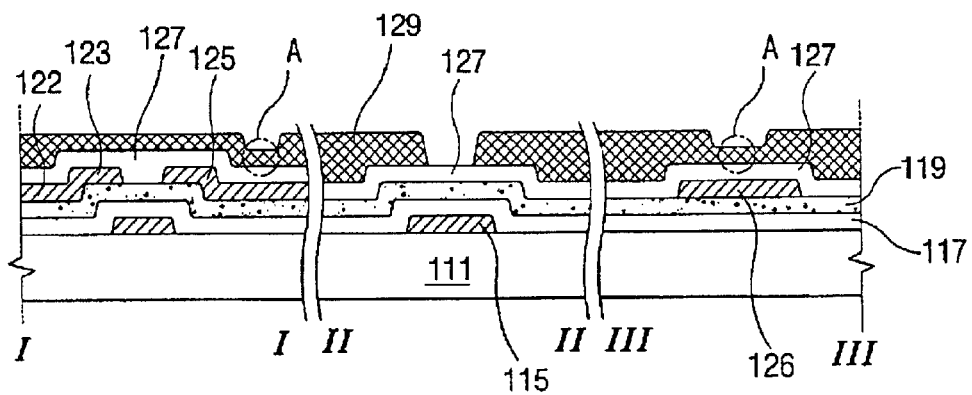

FIG. 3C shows a third mask process and illustrates a step of etching the layers formed over each pad by the photolithography process. First, a photoresist 129 is formed on the second insulation layer 127. The exposure process is then performed using a third mask (not shown) and thus the portions that are not irradiated are removed. At this time, the portion of the third mask corresponding in position to the data pad 126 is formed of a half-tone mask or a diffraction slit. Namely, the third mask includes a half-tone mask pattern or a diffraction slit in corresponding position to the data pad 126 and to the drain electrode 125. The half-tone mask pattern is a translucent material or a semitransparent pattern such that only a portion of the light can pass through the half-tone mask. The diffraction slit uses light-diffraction such that the intensity of the light irradiating the photoresist is lowered. Accordingly, the portion of the photoresist over the gate pad 115 is completely light-shielded, and the portions of the photoresist over the data pad 126 and over the drain electrode 125 result in an incomplete exposure. As described, because the third mask includes the half-tone mask pattern and the diffraction slit over the data pad 126 and over the drain electrode 125, the portions "A" of the photoresist 129 remain in a partially etched-state while the portion of the photoresist over the gate pad 115 is completely removed. The thickness of the residual photoresist "A" is about 500 Å~5000 Å.

Figure 3D:
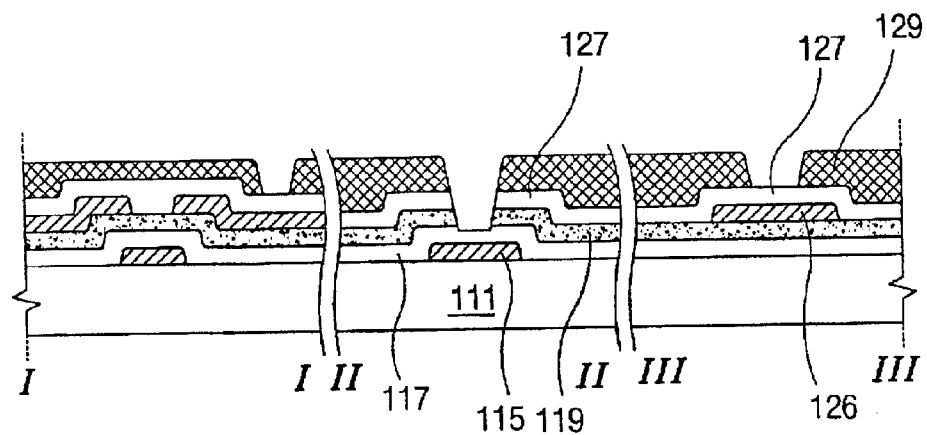

Referring to FIG. 3D, the portions "A" (see FIG. 3C) of the photoresist 129 are removed during etching of the second insulation layer 127 and the semiconductor layer 119 over the gate pad 115. As a result, the first insulation layer 117 remains over the gate pad 115, and the second insulation layer 119 remains over the data pad 126 and over the drain electrode 125.

Figure 3E:
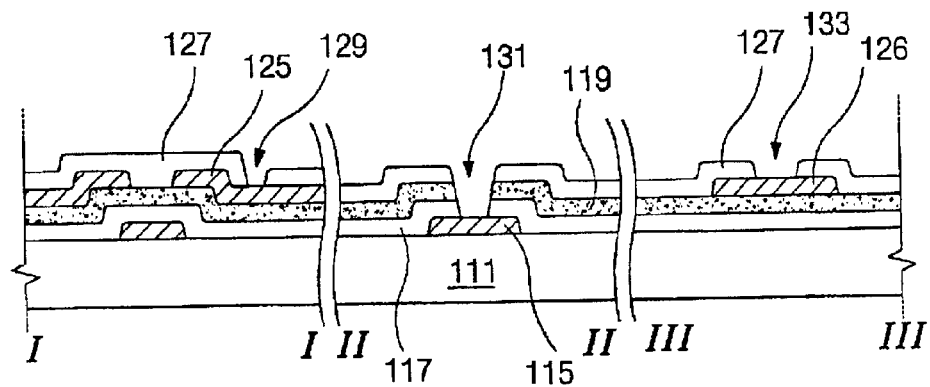

Next, referring to FIG. 3E, the first insulation layer 117 over the gate pad 115 is simultaneously etched out while the second insulation 127 over the data pad 126 and over the drain electrode 125 is etched out. Therefore, the drain contact hole 129 exposing the portion of the drain electrode 125 is formed. A gate pad contact hole 131 and a data pad contact hole 133 are formed over the gate pad 115 and over the data pad 126, respectively. Accordingly, the overetching or damage of the data pad 126 does not occur, in contrast to the conventional art.

Figure 3F:
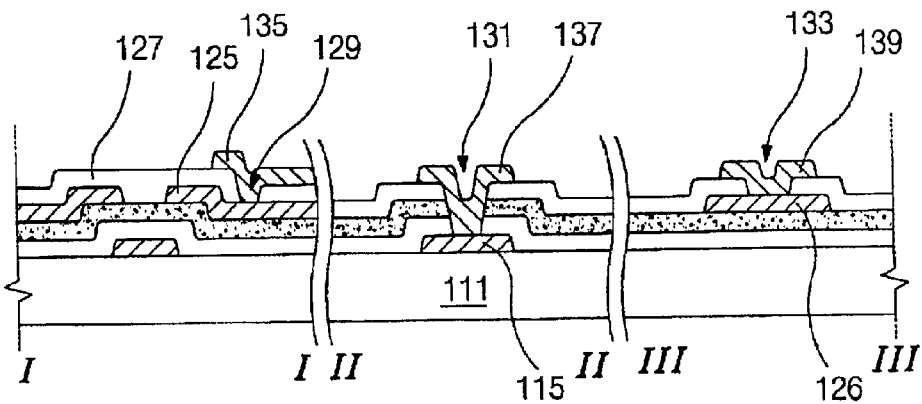

FIG. 3F shows a step of a fourth mask process. A transparent conductive material such as ITO (indium-tin-oxide) or IZO (indium-zinc-oxide) is deposited on the second insulation layer 127. The transparent conductive material is patterned to form a pixel electrode 135 contacting the drain electrode 125 via the drain contact hole 129, a gate pad electrode 137 contacting the gate pad 115 via the gate pad contact hole 131, and a data pad electrode 139 contacting the data pad 126 via the data pad contact hole 133.

In the four-mask process as mentioned above, because the present invention uses the half-tone mask or the diffraction slit in the third mask process, the data pad is not overetched or does not have any damage due to the fact that the residual photoresist over the data pad is etched while etching the second insulation and semiconductor layers over the gate pad. Namely, the residual photoresist acts as an etch stopper. And thus, only each insulation layer, respectively, remains over the gate and data pads.

This method can also be used in a five- or six-mask process. Thus, a second embodiment of the present invention applies the method described above in the five- or six-mask process. In the five- or six-mask process, the semiconductor layer is patterned, and thus the first and second insulation layers are formed over the gate pad, and only the second insulation layer is formed over the data pad.

Figure 4A:
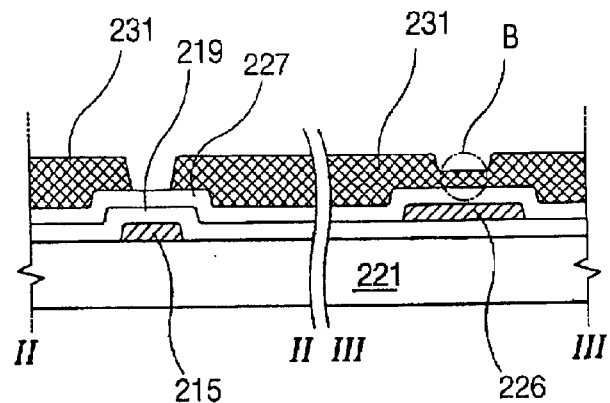
FIGS. 4A to 4C are cross-sectional views taken along lines II—II and III—III of FIG. 1 and illustrate manufacturing process steps of gate and data pads of the array substrate according to a second embodiment of the present invention.
Figure 4B:
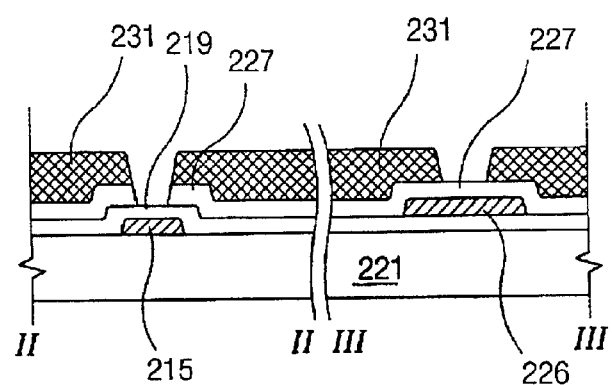
Figure 4C:
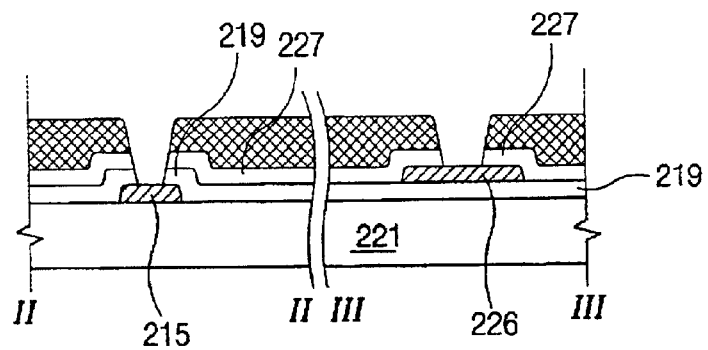

The method of etching the layers formed over the gate and data pads is explained with reference to FIGS. 4A to 4C, hereinafter. The explanation about some process steps is omitted owing to the similarity to FIGS. 3A and 3B. FIGS. 4A to 4C are cross-sectional views taken along lines II—II and III—III of FIG. 1 and illustrate manufacturing process steps of the gate and data pads of the array substrate according to a second embodiment of the present invention.

Referring to FIG. 4A, a photoresist 231 is deposited on the second insulation layer 227. The photoresist 231 is patterned by the exposure process using the mask. At this time, the portion "B" of the photoresist 231 over the data pad 226 is irradiated by the lower intensity light that passes through the half-tone mask or the diffraction slit. Thus, portion "B" of the photoresist 231 having a predetermined thickness remains after developing the photoresist 231. Namely, the residual photoresist acts as an etch stopper.

Referring to FIG. 4B, while etching the second insulation layer 227 over the gate pad 215, the residual photoresist over the data pad 226 is removed. Accordingly, the first insulation layer 219 remains over the gate pad 215, and the second insulation layer 227 remains over the data pad 226. Since the etching ratios of the first and second insulation layers are similar when using dry-etching, the etching of the first and second insulation layers are completed almost at the same time. Thus, as shown in FIG. 4C, the first insulation layer 219 over the gate pad 215 and the second insulation layer 227 over the data pad 226 are etched at the same time.

Accordingly, according to the present invention used in the four-, five- and six-mask processes, overetching or damage of the data pad is prevented. Moreover, defects caused by the resistance between the data pad and the data pad electrode do not occur, and thus the pixel defects of the LCD device are prevented, and thus the manufacturing yield increases.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating an array substrate for use in a liquid crystal display (LCD) device using a four-mask process, the method comprising:
   forming a first metal layer on a substrate;
   forming a gate line, a gate electrode and a gate pad by patterning the first metal layer;
   forming sequentially a first insulation layer, a semiconductor layer and a second metal layer over the patterned first metal layer and on the substrate;
   forming a source electrode, a data line, a drain electrode and a data pad by patterning the second metal layer;
   forming a second insulation layer on the patterned second metal layer and on the semiconductor layer;
   forming a photoresist on the second insulation layer;
   performing an exposure process on the photoresist using a mask;
   removing completely a first portion of the photoresist over the gate pad after performing the exposure process;
   removing incompletely a second portion of the photoresist over the data pad after performing the exposure process, wherein a residual photoresist remains over the data pad;

etching the second insulation and semiconductor layers over the gate pad while etching the residual photoresist over the data pad; and etching simultaneously the first insulation layer over the gate pad and the second insulation layer over the data pad.

2. A method according to claim 1, wherein the mask that is used in irradiating the photoresist includes a half-tone pattern.

3. A method according to claim 1, wherein the mask that is used in irradiating the photoresist includes a diffraction slit.

4. A method according to claim 1, wherein the residual photoresist over the data pad has a thickness of more than 500 Å.

5. A method according to claim 1, wherein the residual photoresist over the data pad has a thickness of less than 5000 Å.

6. A method of fabricating an array substrate for use in a liquid crystal display (LCD) device, the array substrate having gate and data pads, the method comprising:

forming first and second insulation layers over the gate pad;

forming the second insulation layer on the d data pad;

depositing a photoresist on the second insulation layer;

performing an exposure process on the photoresist using a mask;

removing completely a first portion of the photoresist over the gate pad after performing the exposure process;

removing incompletely a second portion of the photoresist over the data pad after performing the exposure process, wherein a residual photoresist remains over the data pad; and etching the first and second insulation layers over the gate pad while etching the residual photoresist and second insulation layer over the data pad, wherein the residual photoresist acts as an etching stopper.

7. A method according to claim 6, wherein the mask that is used in the exposure process of the photoresist includes a half-tone pattern.

8. A method according to claim 6, wherein the mask that is used in the exposure process of the photoresist includes a diffraction slit.

9. A method of fabricating an array substrate for use in a liquid crystal display (LCD) device, the method comprising:

patterning a first metal layer on the array substrate;

forming a first insulation layer and a semiconductor layer over the first metal layer;

patterning a second metal layer on the array substrate;

forming a second insulation layer over the second metal layer;

forming a photoresist over the second insulation layer;

providing a mask over part of the photoresist layer, wherein a designated portion of the mask includes a half-tone pattern for partially exposing a portion of the photoresist beneath the designated portion when the photoresist and the mask are irradiated;

irradiating the photoresist and the mask; and etching the first insulation layer, the second insulation layer and the semiconductor layer to expose portions of the first metal layer and the second metal layer.

10. The method according to claim 9, wherein a residual photoresist remains after irradiating the photoresist and the mask.

11. The method of claim 10, further comprising the step of removing the residual photoresist.

12. A method of fabricating an array substrate for use in a liquid crystal display (LCD) device, the method comprising:

patterning a first metal layer on the array substrate;

forming a first insulation layer and a semiconductor layer over the first metal layer;

patterning a second metal layer on the array substrate;

forming a second insulation layer over the second metal layer;

forming a photoresist over the second insulation layer;

providing a mask over part of the photoresist layer, wherein a designated portion of the mask includes a diffraction slit for partially exposing a portion of the photoresist beneath the designated portion when the photoresist and the mask are irradiated;

irradiating the photoresist and the mask; and etching the first insulation layer, the second insulation layer and the semiconductor layer to expose portions of the first metal layer and the second metal layer.

13. The method according to claim 12, wherein a residual photoresist remains after irradiating the photoresist and the mask.

14. The method of claim 13, further comprising the step of removing the residual photoresist.

15. A method of fabricating an array substrate for use in a liquid crystal display (LCD) device, the method comprising:

patterning a first metal layer on the array substrate;

forming a first insulation layer and a semiconductor layer over the first metal layer;

patterning a second metal layer on the array substrate;

forming a second insulation layer over the second metal layer, forming a photoresist over the second insulation layer;

completely exposing a first portion of the photoresist, partially exposing a second portion of the photoresist and shielding a third portion of the photoresist from exposure; and etching the first insulation layer, the second insulation layer and the semiconductor layer to expose portions of the first metal layer and the second metal layer.

16. The method of claim 15, further comprising the step of removing the second portion of photoresist after the etching step.

* * * * *